United States Patent [19]

Elliott

[11] 4,414,491

[45] Nov. 8, 1983

[54] CURRENT LIMITING POWER SUPPLY FOR ELECTRON DISCHARGE LAMPS

[75] Inventor: William J. Elliott, Zephyr Cove, Nev.

[73] Assignee: Quietlite International, Ltd., Reno, Nev.

[21] Appl. No.: 291,394

[22] Filed: Aug. 10, 1981

[51] Int. Cl.³ .............................................. H05B 37/00
[52] U.S. Cl. .................................... 315/282; 315/222; 315/219; 331/113 A
[58] Field of Search ............... 315/219, 220, 221, 222, 315/282, DIG. 2; 331/113

[56] References Cited

U.S. PATENT DOCUMENTS

| | | | |
|---|---|---|---|
| 2,392,845 | 1/1946 | Foerste | 315/282 |
| 2,949,565 | 8/1960 | Rohloff et al. | 315/282 |
| 3,331,987 | 7/1967 | Powell | 315/282 |
| 3,621,331 | 11/1971 | Barron | 315/207 |
| 4,307,334 | 12/1981 | Peil | 315/219 |

*Primary Examiner*—Harold A. Dixon
*Attorney, Agent, or Firm*—Allegretti, Newitt, Witcoff & McAndrews, Ltd.

[57] ABSTRACT

A power supply including a high frequency inverter circuit coupled to an electron discharge lamp load through a special purpose transformer is disclosed. The transformer is wound on a saturable ferromagnetic core structure forming a first magnetic flux path coupling the primary and secondary windings of the transformer and a second shunt magnetic path including an air gap which carries and increasing share of flux as load current increases. The switching of the inverter circuit occurs in response to the partial saturation of the core. Auxilliary windings serially connected with the primary winding of the transformer and wound about the shunt magnetic path enhance the current regulating properties of the supply.

5 Claims, 2 Drawing Figures

CURRENT LIMITING POWER SUPPLY FOR ELECTRON DISCHARGE LAMPS

This invention relates generally to electronic power supply systems and more particularly, although in its broader aspects not exclusively, to a current-limiting power source for use in connection with electron discharge lamps.

Because of their energy efficiency and long life, electron discharge lamps are increasingly replacing conventional incandescent (tungsten filament) lamps, particularly in commercial, industrial and outdoor lighting applications. Discharge lamps, including both fluorescent lamps and high intensity discharge (H.I.D.) lamps, create light by the passage of an electric current through a vapor or a gas, rather than through a tungsten wire. Such lamps present a dynamic negative resistance to the power source: that is, as the current through the lamp increases, the voltage across the lamp goes down. Moreover, immediately after ignition and before the lamp reaches its normal operating temperature, the voltage across the lamp is quite low. As a consequence, some means of limiting the magnitude of lamp current must be included in the power supply. Typically, such current limiting is accomplished by means of a reactive "core and coil" ballast serially connected with the lamp across the 60 Hz. alternating current line.

It is an object of the present invention to provide a small, light weight and inexpensive power supply for use in connection with electron discharge lamps and other electrical loads which require a current limiting capability.

In a principal aspect, the present invention takes the form of a semiconductor switching circuit which supplies high frequency alternating current energy to the primary winding of a special-purpose transformer whose secondary is connected to an electron discharge lamp. The transformer is wound on a ferromagnetic saturable core structure which includes an air-gapped magnetic shunt member exterior to both the primary and secondary windings. At least one auxiliary winding wound on the shunt member and serially connected connected with the primary winding is employed to improve the current regulating characteristics of the supply. The semiconductor switching circuit preferably comprises a semiconductor inverter circuit including at least one control winding wound on the transformer for switching the inverter when a portion of the core structure reaches saturation.

These and other objects, features and advantages of the present invention may be more clearly understood by considering the following detailed description of a specific embodiment of the invention. In the course of this description, reference will frequently be made to the attached drawings in which.

Figure 1:
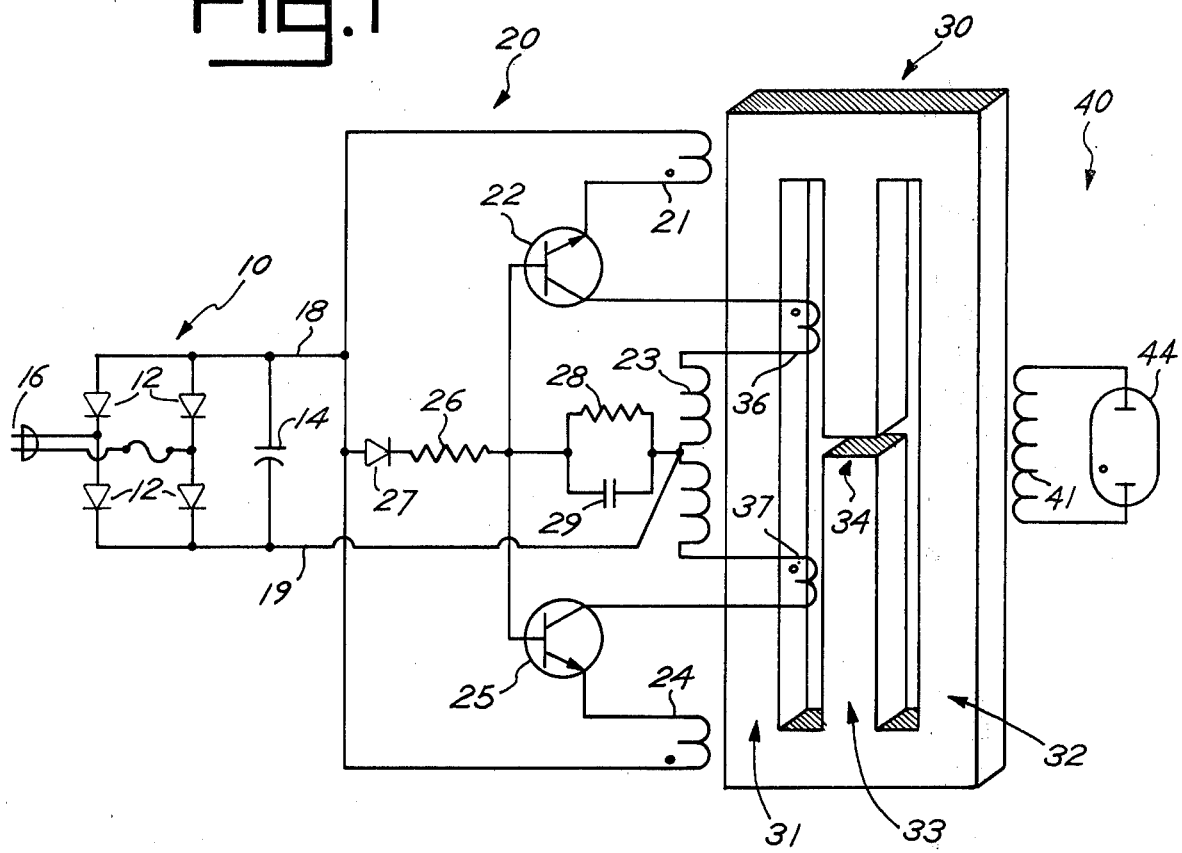
FIG. 1 is a schematic diagram of an embodiment of the invention.

The discharge lamp power supply shown in FIG. 1 comprises a conventional bridge rectifier, shown generally at 10, which converts alternating current line power into a direct current voltage which is supplied to a semiconductor inverter circuit indicated generally at 20. The inverter 20 supplies high frequency alternating current energy to the load circuit shown generally at 40 through a special purpose transformer wound on a ferromagnetic core structure indicated generally at 30.

The direct current voltage needed to operate the inverter 20 is produced by the bridge rectifier diodes 12 and a filter capacitor 14 from a commercial 60 Hz. power source 16. The positive output 18 of the D.C. supply is connected to the negative output 19 by the series combination of an emitter winding 21, the emitter-collector path of a transistor 22, auxilliary winding 36, and one-half of a center tapped winding 23. In symmetrical fashion an emitter winding 24, the emitter-collector path of a transistor 25, auxilliary winding 37 and the other half of primary winding 23 is connected between outputs 18 and 19. The bases of transistors 22 and 25 are connected together and both are connected to the negative terminal 18 by the series combination of a resistor 26 and a reverse-biased diode 27. To complete the inverter circuit, the bases of transistors 22 and 25 are connected to the positive D.C. output 18 (at the center tap of primary 23) by the parallel combination of a resistor 28 and a capacitor 29.

In operation, the inverter circuit 20 operates as a square wave oscillator in which transistors 22 and 25 are turned ON and OFF in phase opposition in response to saturation of the core structure 30 (to be described below). In the absence of flux changes in the core material 30, the current flowing through resistor 28 and capacitor 29 supplies a slight forward bias to both transistors. Due to slight circuit imbalances and/or residual flux in the core structure 30, one of the two transistors will be switched into full conduction while the other is turned OFF as flux in the core structure 30 increases in one direction. When the core 30 reaches saturation, the rate of flux change drops abruptly, removing the forward bias in the emitter winding of the ON transistor, causing it to lose conductivity and reduce the primary current. As a result, that transistor which was formerly OFF turns ON and the cycle continues until the core 30 saturates in the reverse direction. As a consequence the primary winding 23 receives a substantially square wave voltage signal. Capacitor 29 is included to ensure the transistors receive adequate forward bias when power is initially applied to the circuit.

The core structure 30 shown in FIG. 1 includes a first flux path coupling the primary winding 23 to a secondary winding 41. This first flux path includes a primary core section 31 (around which the primary winding 23 and the emitter windings 21 and 24 are wound) and a secondary core section 32 (around which the secondary winding 41 is wound). The core structure 30 further includes a shunt section 33 which is magnetically coupled to the ends of sections 31 and 32, but which is outside the primary and secondary windings. Auxilliary windings 36 and 37 are wound on shunt section 33 on respective sides of a centrally located air gap indicated generally at 34. Secondary winding 41 is connected to supply alternating current energy to an electron discharge lamp 44 which forms a load in the circuit.

To gain an understanding of the principles and operation of the embodiment of the invention shown in FIG. 1, it is helpful to consider the operation of the circuit with the lamp 44 replaced by a purely resistive load.

If the load resistence is very high, little secondary current flows. Because the relative reluctance of the center section 33 is very large compared to the reluctance of the outer sections 31 and 32 due to the presence of the air gap 34, very little flux flows through the central section 33 at low load currents and the primary and secondary windings 23 and 41 are closely coupled. However, as the load resistance decreases and both primary and secondary current increase, the flux in paths 31, 32 and 33 increases. Because of the air gap 34, however, the reluctance of path 33 remains relatively unchanged while the reluctance of branches 31 and 32 increases. Moreover, the increasing load current through secondary winding 41 creates a counter-MMF in core section 32 which further tends to divert flux into the gapped section 33. Thus, increasing load current decouples the primary and secondary windings by increasing the effective reluctance of the core branch 32 relative to that of the shunt branch core 33. As a result, as the load resistance continues to decrease toward short circuit conditions, load current does not increase proportionately but is instead limited.

This current limiting effect is enhanced by the effect of the auxilliary windings 36 and 37. With decreasing load resistance, increased current flows through primary winding 23 and the auxilliary windings 36 and 37. The primary and auxilliary windings aid one another in inducing a flux in the gapped shunt path 33, but oppose one another as seen by the secondary core branch 32. Thus, as primary current increases with decreasing load resistance, the auxilliary windings serve to further decouple the primary and secondary windings 23 and 41 respectively.

Another important contribution of the central core member 33 should also be noted. In a conventional saturable inverter using a toroidal core, increasing load current reduces the net flux in the core due to the increased counter-MMF induced by the secondary winding. Thus the time required to reach saturation increases and the frequency of operation of the inverter decreases for decreasing load resistances. In the arrangement contemplated by the present invention, however, the shifting of flux to the shunt branch 33 stabilizes the operating frequency of the inverter.

Figure 2:
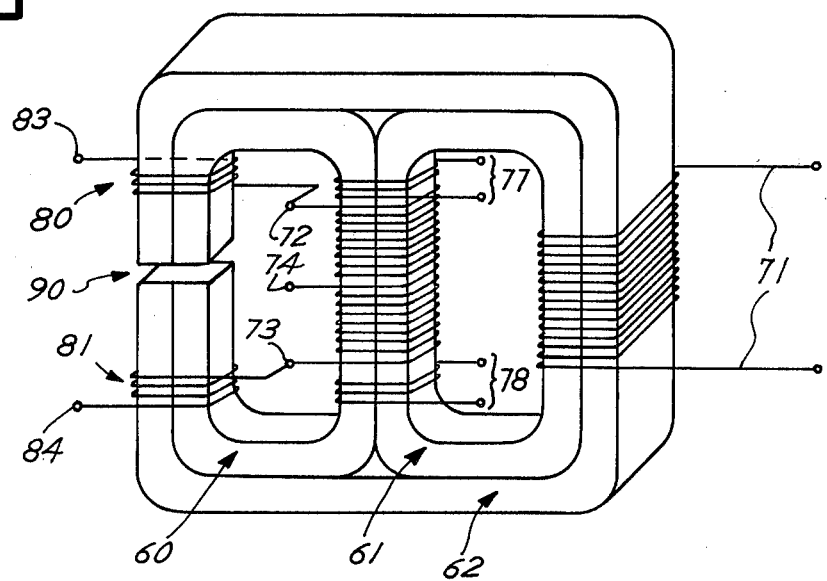
FIG. 2 depicts a preferred magnetic core structure which may be employed in connection with the present invention.

FIG. 2 of the drawings illustrates a preferred ferromagnetic core structure for use in conjunction with an inverter of the type shown in FIG. 1. The core itself possesses a "figure-8" configuration of the type used in three-phase transformers and may be advantageously formed by three rectangular tape wound cores 60, 61 and 62. The two cores 60 and 61 are slightly smaller than one-half size of the core 62 such that they may be inserted side by side within core 62. The secondary winding 71 is wound about the combination of cores 61 and 62 (at the right as shown in FIG. 2). A primary winding having outer terminals 72 and 73, and a center tap terminal 74, is wound about the central, bridging core element formed by the combination of cores 60 and 61. Emitter windings having output terminals 77 and 78 are also wound on the central core section formed by cores 60 and 62. Two current control windings indicated generally at 80 and 81 are wound on the bridging, air-gapped section of the core structure (seen at the left in FIG. 2) and are connected in series with the primary winding, the control winding 80 being connected between terminal 72 and a terminal 83 while the second control winding 81 is connected between terminal 73 and a terminal 84.

To employ the core structure shown in FIG. 2 in conjunction with a circuit of the type shown in FIG. 1, the following connections would be made: Terminals 83 and 84 could be connected to the collectors of transistors 22 and 25; the emitter windings 21 and 24 shown in FIG. 1 would be connected via terminals 77 and 78 respectively; the center tap 74 shown in FIG. 2 would be connected to the negative supply terminal 19 shown in FIG. 1; and the lamp 44 of FIG. 1 would be connected to the secondary winding terminals 71 shown in FIG. 2.

The core structure shown in FIG. 2 differs from that shown in FIG. 1 in that the magnetic shunt path including the air gap (indicated at 90 in FIG. 2) is formed on an outer (rather than the central) leg of the structure, improving the coupling between the primary and secondary winding for enhanced current output. At high load impedances, primary current is limited by the self-inductance of the core structure; however, as load current increases primary current also increases. Due to the presence of the auxilliary windings (36 and 37 in FIG. 1 and 80 and 81 in FIG. 2), this increasing primary current diverts increasing amounts of flux into the shunt core section with the net effect that load current can be stabilized at a substantially constant value over a wide range of load impedances. In the case of a discharge lamp, this means that the nominal operating current at full lamp temperature can be maintained even in the presence of substantial line voltages fluctuations or variations in the nominal operating voltage across the arc tube.

The ferromagnetic material utilized in the core structures shown in FIG. 1 or FIG. 2 preferably takes the form of a high permeability, low coercive force, high saturation flux alloy exhibiting substantially rectangular hysteresis characteristics (e.g. 80% nickel, 20% iron permalloy). That portion of the core structure which couples the primary and secondary windings may be advantageously constructed of a higher saturation-flux material, or have a greater effective cross-sectional area, than that of the bridging shunt member such that the shunt-member saturates first to control inverter switching.

As an illustrative example of one working embodiment of the inverter circuit of FIG. 1, the following components may be employed:

| | |
|---|---|
| Diodes 10 | 3 amp., 600 volt |
| Capacitor 14 | 200 microfarad, 350 volt |
| Transistors 22 and 25 | MJE-13005 |
| Resistor 26 | 1 ohm, 1 watt |
| Diode 27 | 1 N 4004 |
| Resistor 28 | 22 K ohms, 1 watt |
| Capacitor 29 | 1 microfarad, 200 volt |
| Lamp 44 | 100 watt mercury vapor lamp (type H 38) |

In connection with the inverter circuit specified above, a transformer configured as shown in FIG. 2 and constructed to the specifications shown below has been found to provide suitable operation.

| | |
|---|---|
| core Permalloy-80 (Magnetics Type ME0043 three-phase transformer core with .05" gap) | permalloy-80 |
| Dimensions of cores 60 and 61 1.5" path length .875 sq. in. area | 60 1.5 × .875" |
| Dimensions of core 62 1.94" path length .875 sq. in. area | 1.94 × 1.875" |
| Primary winding (center-tapped) | 85 tap 85 turns |
| Secondary winding 71 | 170 turns |
| control windings 77 and 78 | 1 tap 1 turns |
| auxilliary windings 80 and 81 | 10 tap 10 turns. |

Using the above components, the power supply delivers a substantially constant RMS output current, as substantially constant frequency, as load impedance varies as shown below:

| Load Resistance (ohms) | Output Current (amperes) | Output Waveform Period (msec.) |
| --- | --- | --- |
| Infinite | 0 | .26 |
| 1 ohm | 1.18 | .195 |
| 17 ohms | 1.15 | .195 |
| 42 ohms | 1.089 | .195 |
| 92 ohms | 1.02 | .195 |
| 141 ohms | .92 | .195 |

It is to be understood that the specific embodiment of the invention which has been described is merely one example of an application of the principles of the present invention. Numerous modifications can be made by those skilled in the art without departing from the true spirit and scope of the invention.

What is claimed is:

1. A current limiting power supply comprising, in combination, a ferromagnetic transformer core structure, at least a portion of which comprises a magnetically saturable material, comprising first, second and third magnetic flux paths joined at one of their respective ends at a first common junction and joined at their opposing ends at a second common junction, a primary winding wound about the first of said paths, a secondary winding wound about the second of said paths, an auxilliary winding wound about the third of said paths, a semiconductor switching circuit having its input connected to a source of electrical energy and havings its output connected to supply a high-frequency alternating current to the series combination of said primary winding and said auxilliary winding, said semiconductor switching circuit including at least one control winding for controlling the switching time of said semiconductor circuit in response to the saturation of said saturable material, and a load circuit connected to said secondary winding.

2. A current-limiting power supply as set forth in claim 1 wherein the reluctance of said third path is substantially greater than the reluctance of said first and second paths.

3. A current-limiting power supply as set forth in claim 2 wherein said third path includes an air gap.

4. A current-limiting power supply as set forth in claim 1 wherein said core structure possesses a figure-8 configuration with said first flux path being the central bridging portion of said configuration.

5. A power supply as set forth in claims 1, 2, 3, or 4 wherein said load circuit comprises an electron discharge lamp.

* * * * *